United States Patent [19]
Eggleton et al.

[11] Patent Number: 5,907,647
[45] Date of Patent: May 25, 1999

[54] LONG-PERIOD GRATING SWITCHES AND DEVICES USING THEM

[75] Inventors: Benjamin John Eggleton; Justin Boyd Judkins, both of Berkeley Heights; Richart Elliott Slusher, Lebanon; Ashish Madhukar Vengsarkar, Berkeley Heights, all of N.J.

[73] Assignee: Lucent Technologies Inc., Murray Hill, N.J.

[21] Appl. No.: 08/802,051

[22] Filed: Feb. 18, 1997

[51] Int. Cl.[6] .................................................. G02B 6/34
[52] U.S. Cl. .......................... 385/28; 385/37; 385/122
[58] Field of Search ............................. 385/12, 15, 27, 385/28, 29, 31, 37, 39, 122

[56] References Cited

U.S. PATENT DOCUMENTS

| | | | |
|---|---|---|---|
| 4,687,286 | 8/1987 | Winful | 385/28 X |
| 4,904,045 | 2/1990 | Alferness et al. | 385/37 |
| 5,430,817 | 7/1995 | Vengsarkar | 385/37 |
| 5,444,803 | 8/1995 | Kim et al. | 385/28 |
| 5,455,178 | 10/1995 | Fattinger | 385/12 X |
| 5,479,260 | 12/1995 | Fattinger | 385/12 X |
| 5,641,956 | 6/1997 | Vengsarkar et al. | 385/28 X |

*Primary Examiner*—John D. Lee

[57] ABSTRACT

In accordance with the invention, an optical switch employs a long-period grating for switching light between alternative optical paths. In essence, the device comprises a variable intensity light source, a length of optical waveguide dimensioned for co-propagating light in two distinguishable modes, and a long-period grating in the waveguide for coupling between the two modes. The waveguide is nonlinear so that the effective refractive index is a function of intensity. As a consequence the coupling produced by the grating is a function of intensity. Thus different levels of light intensity can switch between the separate modes. Advantageously a mode separator is provided for directing light in the two modes onto respectively different optical output paths. A variety of two-mode switches and optical limiters are described, as well as an optical system using the switch.

15 Claims, 5 Drawing Sheets

LONG-PERIOD GRATING SWITCHES AND DEVICES USING THEM

FIELD OF THE INVENTION

This invention relates to optical devices and, in particular, to long-period grating switches and devices using them.

BACKGROUND OF THE INVENTION

Optical waveguides are key components in modern telecommunications systems. Optical waveguides are typically in the form of optical fibers or "planar" waveguides. In essence, an optical fiber is a small diameter circular waveguide characterized by a core with a first index of refraction surrounded by a cladding having a second (lower) index of refraction. It is capable of transmitting an optical signal containing a large amount of information over long distances. A planar waveguide is usually a substrate-supported waveguide of rectangular cross section. It also has a core and a cladding. Planar waveguides are typically much shorter than fibers, but can be formed in complex configurations. Typical optical waveguides are made of high purity silica with minor concentrations of dopants to control the index of refraction.

A typical optical system comprises a source of optical input signals, a network of optical waveguides coupled to the source, and one or more receivers coupled to the waveguide for receiving the optical signal. Amplifying devices such as rare-earth doped amplifiers can be disposed at various points in the network. Contemplated WDM telecommunications systems would employ wavelength division multiplexing using many different wavelength channels to convey information between points in the network. Contemplated optical data processing applications would employ similar networks on a much smaller distance scale.

Optical switching devices are key components in optical communications and processing networks. Switches are essential for routing communications or data channels from one point in the network to another.

Conventional optical switching devices are mainly hybrid devices using electro-optical or electromechanical effects. They are typically slow, expensive and lossy. They must be inserted into the system by cutting and splicing with high precision alignment. Accordingly there is a need for a simple, fast, efficient optical switching device.

SUMMARY OF THE INVENTION

In accordance with the invention, an optical switch employs a long-period grating for switching light between alternative optical paths. In essence, the device comprises a variable intensity light source, a length of optical waveguide dimensioned for co-propagating light in two distinguishable modes, and a long-period grating in the waveguide for coupling between the two modes. The waveguide is nonlinear so that the effective refractive index is a function of intensity. As a consequence the coupling produced by the grating is a function of intensity. Thus different levels of light intensity can switch between the separate modes. Advantageously a mode separator is provided for directing light in the two modes onto respectively different optical output paths. A variety of two-mode switches and optical limiters are described, as well as an optical system using the switch.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for the purpose of illustrating the concepts of the invention and, except for the graphs, are not to scale.

DETAILED DESCRIPTION

This description is divided into three parts. Part I describes the nature and qualitative behavior of the basic long-period grating switch. Part II describes preferred devices and systems using the switch, and Part III describes a quantitative example of the design and behavior of an exemplary switch.

I. The Optical Switch

Figure 1:
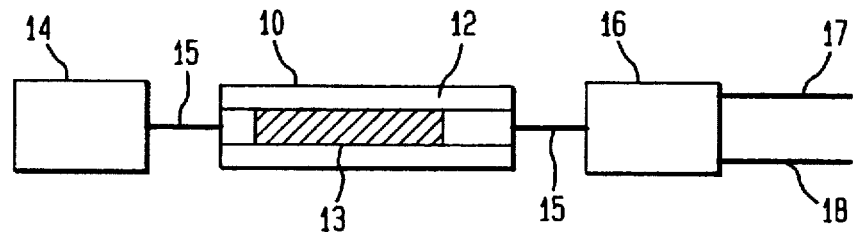
FIG. 1 is a schematic diagram of a long-period grating optical switching device in accordance with the invention.

Referring to the drawings, FIG. 1 schematically illustrates a long-period grating optical switching device comprising a length of optical waveguide 10 for transmitting light in at least two distinguishable modes. The waveguide has a core 11 surrounded by a lower index cladding 12. The core 11 includes a long-period grating 13.

The waveguide 10 can be either optical fiber or planar waveguide. The waveguide is composed of a material having an index of refraction which is a non-linear function of light intensity. This is true of silica glass for sufficiently high intensity and other transparent materials such as semiconductors and organic layered materials for lower intensities. Glasses doped with telluride or selenide also exhibit non-linearity at lower intensities.

A controllable intensity light source 14 is provided for injecting a beam of light 15 into the waveguide in at least one of the two modes. The light source 14 can be a variable intensity laser, a pair of lasers at least one of which is variable, or even a length of fiber ultimately connected to a variable intensity laser. The range of controllable intensity variation in the light source should extend into the region where the waveguide 10 exhibits a changed index of refraction. In a preferred arrangement, the source 14 is a composite source comprising a low intensity source and a high intensity control source. The signal source and the control source can have the same or different wavelengths, and they can pass through the waveguide 10 in the same or different directions.

A mode separator 16 is advantageously disposed in waveguide 10 or coupled to its output for providing respectively different optical paths 17, 18 for light in the two modes. Such separator devices are described in greater detail in W. V. Sorin et al., "Highly Selective Evanescent Modal Filter For Two-Mode Optical Fibers", *Optics Letters*, Vol. 11, pp. 581–583 (September, 1986) which is incorporated herein by reference. The separate paths 17, 18 can be waveguides or even a dissipative path which effectively terminates light in one of the modes.

The precise form of the mode separator depends on the shape of the waveguide and the two modes chosen for the device. In devices to switch from a core mode to a cladding mode, the mode separator can be a spatial filter for selectively passing only one of the two modes. The precise configuration for the spatial filter can be determined by observing the intensity profile of the mode to be filtered and providing an amplitude mask of same pattern. For example, a spatial filter for terminating a cladding mode would be an amplitude mask in the form of a ring. Alternatively, a cladding mode can be terminated in fiber by a loop near the end of the device for dissipating the cladding mode by scattering.

The long-period grating 13 comprises a plurality of index perturbations 16 of width w spaced apart by a periodic distance d where typically 50<d<1500 microns. Advantageously w is approximately ½ d. Long-period gratings and their fabrication are described in greater detail in A. M. Vengsarkar, U.S. Pat No. 5,430,817 (Jul. 4, 1995) which is incorporated herein by reference.

Switching in this device depends upon coupling between the two modes. The degree of coupling depends on 1) the presence of the long-period grating 2) the intensity of the light; and 3) the nonlinearity of the waveguide.

In the absence of long-period grating 13 there is no coupling between the modes of the waveguide. Light launched into the waveguide in the fundamental mode remains guided in the fundamental mode.

In the presence of the grating, light in the fundamental mode can couple to a second higher order mode if a phase matching condition is met. For example, strong coupling will occur between the fundamental mode and the $m^{th}$ cladding mode at wavelengths given by:

$$\lambda_m = d(n^{01} - n^m),$$

where d is the period of the grating and $n^{01}$ and $n^m$ are respectively, the effective indices of the fundamental mode and the $m^{th}$ cladding mode. This phase matching condition is satisfied for only a narrow range of wavelengths, and thus the grating conventionally acts as a filter.

In the conventional operation of a long-period grating, light is launched into the waveguide in the fundamental mode. If the light is centered at a wavelength at which strong coupling occurs, then light is coupled from the fundamental mode to the higher order mode. Upon transmission through the grating, the two modes will again propagate approximately independently with negligible coupling between them.

For switching in accordance with the present invention, the coupling takes place at high intensities where the nonlinearity of the waveguide (second and third orders) becomes important. To understand the switching effect, consider a $\chi^3$ medium in which the refractive index is intensity dependent, i.e. $n = n_0 + n_2 I$. An intense pulse propagating through the core increases the local refractive index and shifts the transmission minimum of the grating to a longer wavelength. This wavelength shift will produce optical switching if the wavelength of the incident pulse is chosen to be in the spectral region where the slope of the transmission resonance is large. The magnitude of the wavelength shift can be approximated by, $$\Delta\lambda/\lambda_m = n_2 I/\Delta n_g,$$

where $n_2$ is the nonlinear coefficient of the medium, I is the peak intensity of the pulse and $\Delta n_g$ is the difference between the group indices of the core mode and the cladding mode. In long-period fiber gratings $\Delta n_g$ is small, and the magnitude of the shift is large as compared to Bragg gratings.

For qualitative understanding of the switching effect, consider an intense beam tuned to resonance in the spectral region strongly coupled to a higher order cladding mode. As the input intensity is increased, the resonance shifts to longer wavelengths. At sufficiently high intensities the resonance is shifted from the incident beam and thus the core mode and the higher order mode are no longer phase matched. The core mode does not couple into the higher order mode and thus transmission in the core mode remains high.

On the other hand, consider the case where the incident beam is tuned on the long wavelength side of the transmission resonance where the transmission is high. As the intensity is increased, the resonance shifts to longer wavelengths and eventually becomes coincident with the beam. Thus at high intensities the beam is coupled into the higher order mode and thus transmission in the core mode is minimal. But transmission in the higher order mode is now high.

These qualitative concepts are quantified below in part III which presents an example of switch design and performance.

II. Systems and Devices Using the Switch

A. Two Mode Switch

Figure 2:
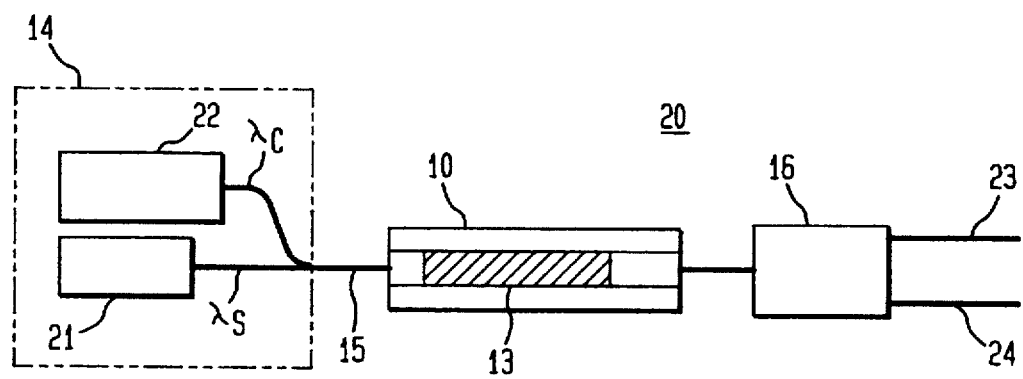
FIG. 2 illustrates a two-mode optical fiber switch using the switching device of FIG. 1.

FIG. 2 schematically illustrates a preferred two mode switch 20 employing a long-period grating. In this embodiment, the light source 14 is a composite source comprising a signal source 21 of a relatively low intensity, information carrying optical signal $\lambda_s$ and a control source 22 carrying a relatively high intensity control signal $\lambda_c$. The mode separator 16 separates the two modes from the output of long-period grating 13 into respective waveguide paths 23, 24. Such a mode separator is described in the aforementioned Sorin et al. reference. The waveguide 10, 23, 24 is preferably optical fiber.

In operation, when the high intensity control source 22 is on, the low intensity signal beam is directed to waveguide 23. When the control source is off, the low intensity signal beam is directed to waveguide 24. It should be noted that the control signal $\lambda_c$ can differ from $\lambda_s$ both in wavelength and direction of propagation through the grating 13.

This operation can be understood as follows. The low intensity signal $\lambda_s$, e.g. a communications signal made up of bits of information, is directed into the long period grating as a core mode. It is tuned to a wavelength slightly longer than a particular cladding mode resonance of the long-period grating. In the absence of a control signal $\lambda_c$, $\lambda_s$ will continue as a core mode and not couple to the cladding mode. It will appear in the core mode output waveguide 24. In the presence of a control signal $\lambda_c$, $\lambda_s$ will couple to the cladding mode and appear in the cladding mode output waveguide 23. This switching is achieved through the nonlinearity of the waveguide. The intense control beam increases the refractive index in the core and thus shifts the transmission resonance to the longer wavelength of $\lambda_s$ where coupling takes place. Thus by varying the intensity of the control beam, the weak signal beam can be channeled into a preferred mode and path.

In an alternative embodiment, both modes are core modes such as the $LP_{01}$ mode and the $LP_{02}$ mode. The $LP_{02}$ mode has a simple flower-shaped cross-sectional profile which is easy to separate from the $LP_{01}$ mode by spatial filtering.

In yet further embodiments the grating can be blazed to couple to asymmetric modes such as the $LP_{11}$ mode. These modes have profiles which are dramatically different from the symmetric modes, thereby facilitating separation by spatial filtering.

Figure 3:
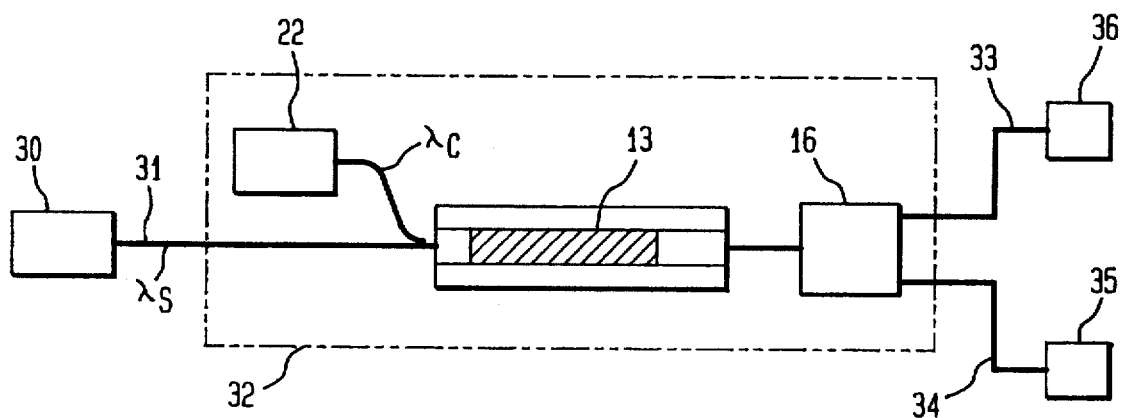
FIG. 3 illustrates an optical system using the switch of FIG. 2.

Such a switch permits all-optical routing of a signal beam in an optical communications system or an optical processing system. FIG. 3 illustrates the use of the switch in such a system comprising a system signal source 30, a first transmission path 31, a two-mode switch 32, a pair of output transmission paths 33, 34 and optical receivers 35, 36.

The system signal source 30 (which corresponds to element 21 of FIG. 2) can be a modulated semiconductor laser. The transmission paths 31, 33, 34 are optical fibers or planar waveguides, and the receivers 35, 36 can be photodetectors such as photodiodes. The switch is a long-period grating switch according to FIG. 1 and is preferably a two-mode switch as shown in FIG. 2. The control source 22 can be a YLF laser. Advantageously, a filter arrangement such as a Bragg grating (not shown), is provided for removing $\lambda_c$ after it has passed through the grating 13.

Switch 32 permits all optical switching of the information signal $\lambda_s$ between receivers 35, 36. A plurality of such switches would permit all optical switching among a larger number of receivers. Thus the switches can be used in a complex network to route signals as desired.

B. Optical Limiter

Figure 4:
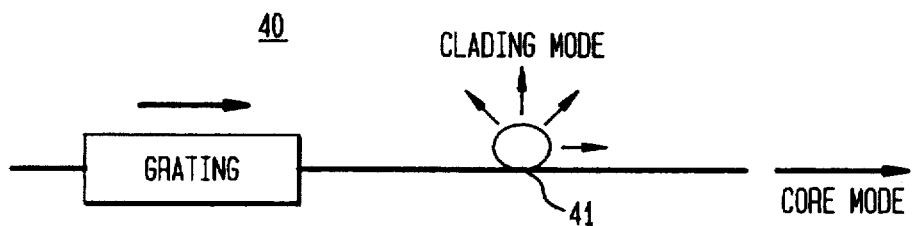
FIG. 4 is a schematic diagram of an optical limiter using the switching device of FIG. 1.

FIG. 4 schematically illustrates an optical limiter 40 employing a long-period grating switching device wherein the mode separator is a fiber loop 41. An optical limiter is a device which attenuates the intense parts of a light signal. Here the intense part of the pulse is coupled into the cladding and scattered out of the fiber at the loop. The cladding mode escapes through the fiber-air interface via bending losses. The fundamental mode is unaffected by the bend and continues on.

Figure 5:
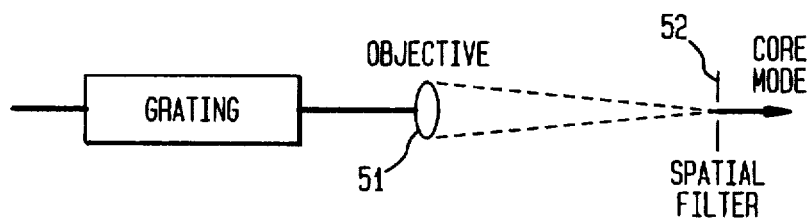
FIG. 5 is a diagram of an alternative embodiment of a limiter.

FIG. 5 shows an alternative embodiment of a limiter where the mode separator comprises a focusing lens 51 and a spatial filter 52. Light emerging from the fiber is focused by the lens at some distance from the output. The spatial filter placed at the focal plane filters the cladding mode while permitting the fundamental mode to be transmitted.

III. Design of an Exemplary Optical Switch

Optical switching in a long-period grating can be better understood by consideration of the design and operation of an exemplary device. In particular, we consider a long-period grating that couples light from the fundamental mode, $LP_{01}$, having propagation constant $\beta_c$, and the mth cladding mode, having propagation constant $\beta_{cl}^m$. In the absence of any grating, light launched into the core remains guided by the core. Strong coupling to the cladding mode occurs if the period of the grating is chosen for wavevector matching between the fundamental mode and the mth cladding mode. The phase matching condition is given by $\beta_c - \beta_{cl}^m = \beta_g = 2\pi/d$, where d is the grating period.

The peak wavelength of the mode coupling can be written as, $$\lambda_m = d(n^{01} - n^m) \quad \text{(Eq. 1)}$$

where $n^{01}$ and $n^m$ are the effective indices of the fundamental mode and the cladding mode, respectively.

The coupling to the cladding modes in the long-period grating manifests itself as a loss in the transmission spectrum centered at wavelengths given by Eq. 1. The half-width of the mth resonance is well approximated by, $$\Delta\lambda/\lambda_m = n_2 I / \Delta n_g, \quad \text{(Eq. 2)}$$

where $n_2$ is the nonlinear coefficient of the medium, I is the peak intensity of the pulse and $\Delta n_g$ is the difference between the group indices of the core mode and the cladding mode. The strength of the resonance is related to the amplitude of the ultraviolet induced index modulation which is of the order of $10^{-4}$.

Figure 6:
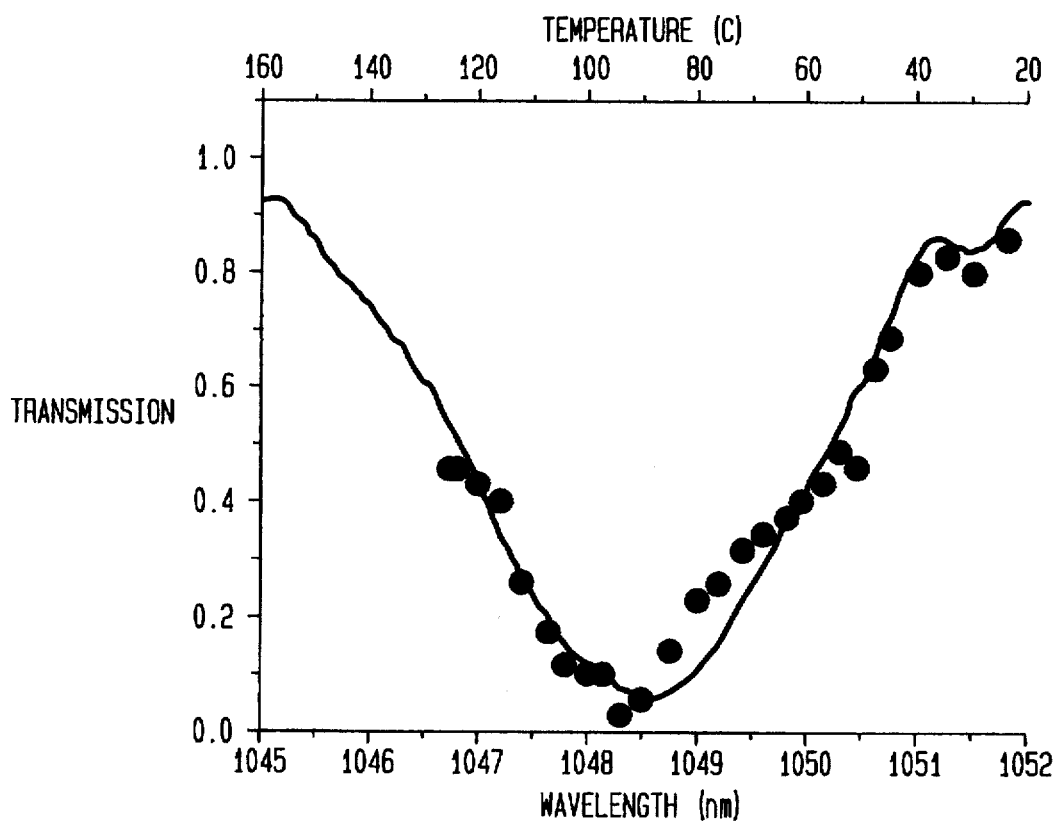
FIG. 6 is the transmission spectrum of an exemplary long-period grating.

FIG. 6 shows part of the transmission spectrum of an exemplary long-period grating. It has a period d=320 μm, a length of 55 mm and $n_g^{01} - n_g^m \sim 0.003$. The strength of the resonance is approximately 12 dB at the peak and has a halfwidth of $\Delta\lambda_w \sim 2$ nm, is approximately consistent with Eq. 2.

Now consider an intensely dependent refractive index:

$$n = n_0 + n_2 I, \quad \text{(Eq. 3)}$$

where n is the total index, $n_0$ is the linear index, I is the effective light intensity in the fiber core and for silica fiber $n_2$ is approximately $2.6 \times 10^{-16}$ cm$^2$/W. This intensity modulation of the refractive index is responsible for self phase modulation, four-wave mixing and solitons. An intense pulse propagating through the core increases the local refractive index in the core and thus shifts the transmission minimum of the fiber grating to longer wavelengths. By manipulation of Eq. 1 and Eq. 3 it can be shown that the resonance shifts to longer wavelengths by an increment $$\Delta\lambda_s = \frac{n^{01} - n^m}{n_g^{01} - n_g^m} n_2 d \Delta I, \quad \text{(Eq. 4)}$$

where the prefactor in Eq. 4 is determined by the waveguide geometry. For the FIG. 6 fiber grating the wavelength shift, according to Eq. 4, is given by $\Delta\lambda_s$(nm)~0.06 $\Delta I$(GW/cm$^2$). Note that the shift is proportional to the period of the grating which is also the case in a Bragg grating where typically the period is of the order of 1 μm. The corresponding shift in a Bragg grating is thus two orders of magnitude less than that for a long-period grating. In principle the shift of the long-period grating can be enhanced by manipulating the waveguide geometry in a way that decreases the difference in the group indices of the core and cladding modes. Clearly this wavelength shift can lead to optical switching effects if the wavelength of the incident pulse is chosen to be in a spectral region where the slope of the resonance is large. As the intensity is increased the resonance shifts to longer wavelengths, and the transmission increases. At first it appears that the required intensities will be relatively low for the long-period grating, since the period is very large compared to a Bragg grating (where the period is of the order of the wavelength). However, the shift in $\lambda^m$ must be large enough to change the transmission of the grating by a significant fraction. As seen in FIG. 6 and from Eq. 2 the long-period grating spectral dip is typically a few nanometers. For significant optical switching, we desire $\Delta\lambda_s > \Delta\lambda_w$, and thus for the grating shown in FIG. 6 we require intensities near 20 GW/cm$^2$. This is still significantly less than the required switching power for a typical Bragg grating, where significant switching results have been difficult. The design of the grating should focus on producing a strong resonance and a sharp slope in the spectral transmission. This can be achieved by increasing the length of the grating [c.f. Eq. 1]. Of course there is also a limit due to the spectral width of the incident pulse. In these experiments the pulse spectral width of 0.03 nm is much less than the spectral width of the long-period grating.

In a practical device, the index of refraction has to be increased such that the shift in the resonance is sufficient to change the transmission of the grating by an amount sufficient to induce coupling. Given a nonlinear index change $\Delta n_{n1}$ the shift in the resonance ($\Delta \lambda s$) is related to the properties of the waveguide, specifically the difference in the group velocity of the two modes ($\Delta n_g$):

$$\Delta \lambda s / \lambda_m = \Delta n_{n1} / \Delta n_g$$

The transmission spectrum of the long-period grating depends on the details of the grating though for a uniform grating we can approximate the half width $\Delta \lambda_w$ by, $$\Delta \lambda \omega = 0.4 \, \lambda_m^2 / (L \Delta n_g),$$

where L is the length of the grating.

For high contrast switching we desire that the resonance be shifted by amount of the order of its half-width. If we desire that $\Delta \lambda s > \Delta \lambda \omega$, we have the condition:

$$\Delta n_{n1} > 0.4 \, \lambda_m / L.$$

For example: consider a 10 cm long grating at $\lambda_m = 1.0 \, \mu m$. For complete switching we require $\Delta n_{n1} = 4 \times 10^{-6}$. More generally of course optical switching effects and particularly pulse reshaping and optical limiting occur at index changes significantly less than this. In this case a good estimate for the required refractive index change would have to be based on the particular spectrum of the grating being considered.

The dispersion in the long-period gratings is very small because the difference in the group velocities of the modes is small. Thus the dispersion of the grating does not appreciably affect the nonlinear propagation as it does the Bragg grating case where nonlinear self phase modulation and dispersion can cancel to produce soliton formation. However, we expect pulse reshaping due to the time-dependent pulse intensity, and the associated changes in transmission with the shifting spectrum.

Figure 7:
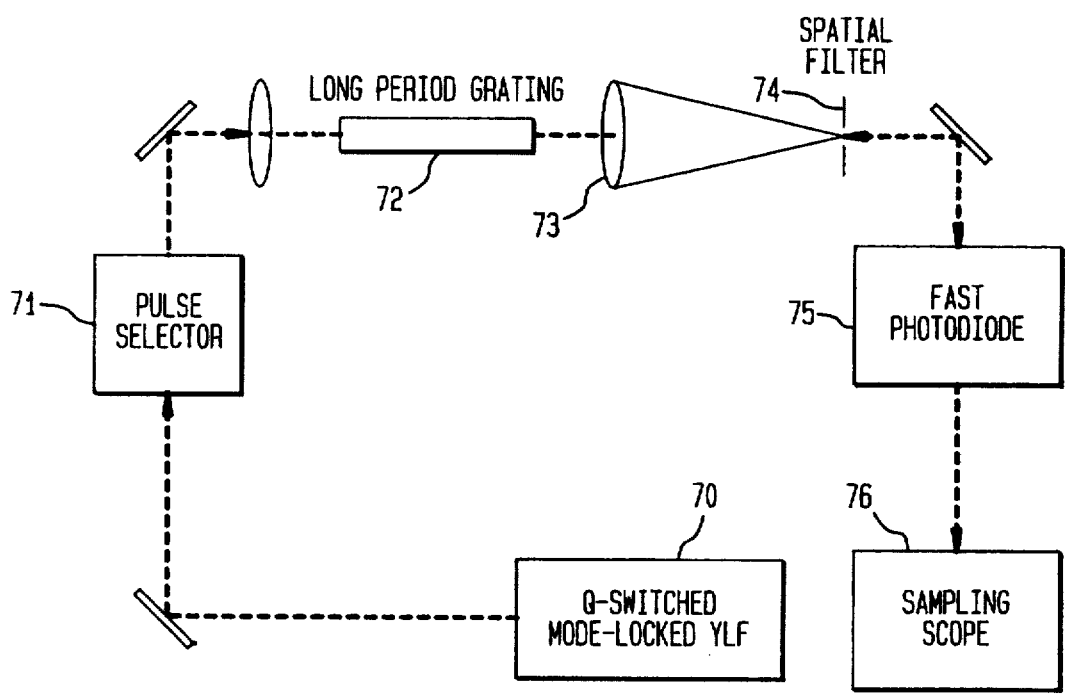
FIG. 7 schematically illustrates an experimental set up used in measuring the properties of an exemplary optical switch according to FIG. 1.

A schematic diagram of the experimental apparatus is shown in FIG. 7. Briefly, 100 ps transform limited pulses, generated by a modelocked, Q-switched YLF laser 70 at a repetition rate of 500 GHz are coupled through a pulse selector 71 into the 8 $\mu m$ diameter core of a 5 cm long-period grating 72. The central wavelength of the YLF laser is 1052.8 nm which is approximately coincident with the grating resonance. The peak power of the pulse coupled into the fiber is varied between 0 and 10 kW; this corresponds to a peak intensity of 20 GW/cm$^2$ propagating in the core of the fiber. A lens 73 and spatial filter 74 are then used to remove light guided by the cladding mode, though in practice a fraction of the cladding light does reach the detector. Finally the transmitted intensity is detected using a fast photodiode 75 (resolution 20 ps) and displayed on sampling scope 76. The length of the fiber is minimized to ensure that only nonlinear effects occurring in the grating are significant.

In order to check the linearity of the system, a 5 cm length of blank fiber was used in the apparatus, and its transmission was measured for incident intensities in the range of interest for the nonlinear grating effects. We observed that the transmission was linear with input intensity and that the pulse shapes did not change appreciably with intensity. This linearity is exactly what is expected for the blank fiber and makes us confident that all effects observed later are entirely due to the grating.

Figure 8:
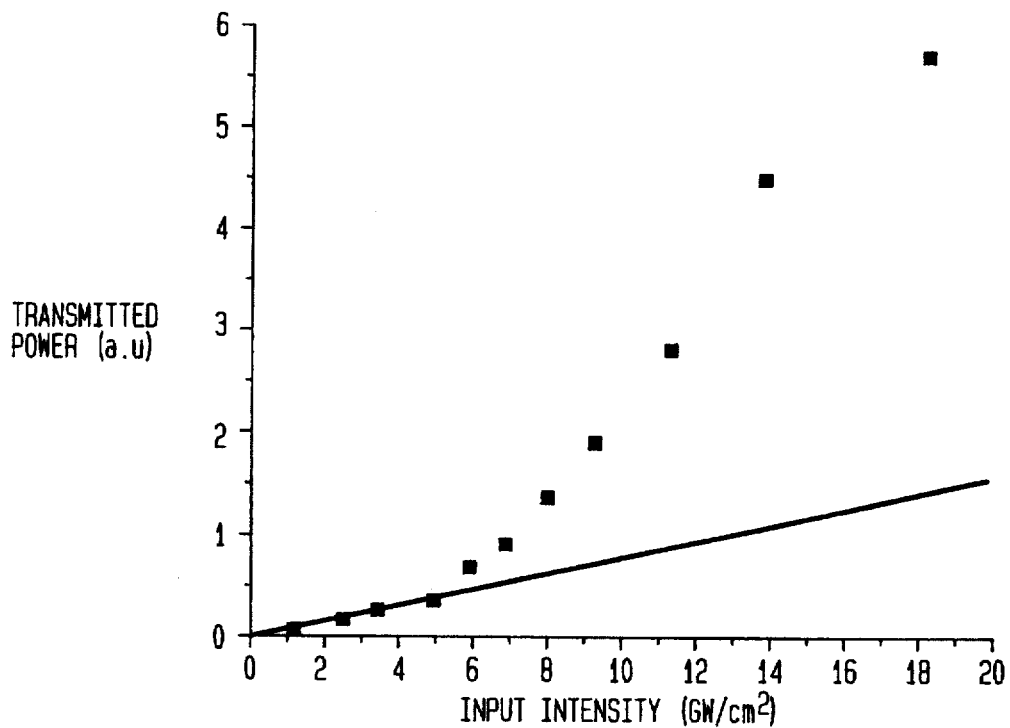
FIGS. 8–11 are graphical illustrations showing the nature of the exemplary switch.

The long-period fiber gratings were fabricated by exposing hydrogen-loaded germanosilicate fibers with an ultraviolet ($\lambda = 248$ nm) source through an amplitude mask made of chrome-plated silica. The grating spectrum was monitored during exposure until the desired spectrum was obtained. The fiber grating was subsequently annealed in order to stabilize its optical properties. By varying the temperature from 20° C. to 130° C. and thus shifting the spectrum of the gratings with respect to the fixed wavelength laser spectrum and measuring the transmitted power at low input intensities, we obtain the transmission spectrum shown in FIG. 8. The apparent tuning of the transmission minimum is approximately 5 nm/100° C. where we note that increasing the temperature shifts the resonance to longer wavelengths and thus in FIG. 8 increasing temperatures corresponds to decreasing wavelengths. At room temperature the laser wavelength is on the long wavelength side of the transmission minimum.

We first heated the grating to a temperature of 110° C. such that the YLF laser spectrum is centered on the short wavelength side of the transmission resonance; see FIG. 6. At this wavelength the grating transmits only 20% of the launched light through the core while the remaining 80% is coupled into the cladding mode. As the input intensity increased we observe the transmitted power (integrated intensity) shown in FIG. 8. At low intensities the transmission is linear as to be expected. Note that at intensities of 5 GW/cm$^2$ the transmission is super linear and that at 20 GW/cm$^2$ the transmission approaches unity. Of course the superlinear behavior is as expected and occurs because the resonance shifts to longer wavelengths at high intensities such that the transmission for the pulse increases. In fact we can infer from these results a shift in the transmission resonance of approximately 2 nm which is in good agreement with the shift predicted by Eq. 4. We also studied the transmitted pulse shape and observed that at high intensities the pulse undergoes narrowing.

Figure 9:
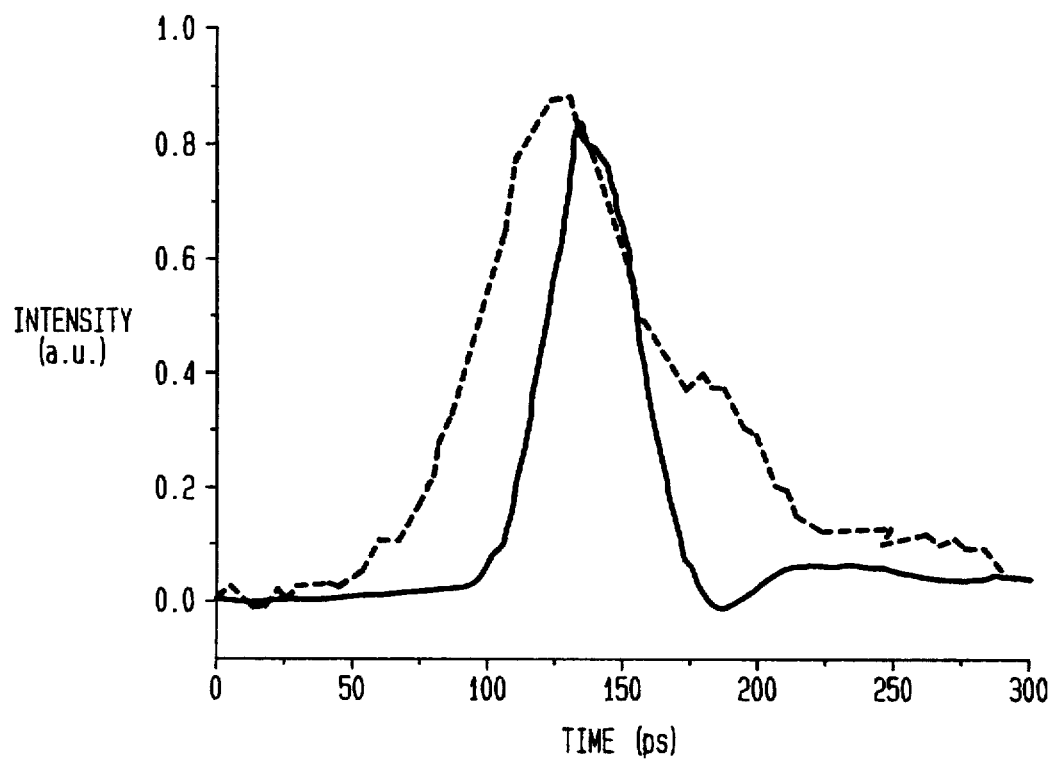

FIG. 9 shows the transmitted intensity for two different input conditions. The solid line shows the transmitted pulse for an input intensity of 1 GW/cm$^2$, effectively corresponding to the output of the laser. The dashed line shows the transmitted pulse for an input intensity of 20 GW/cm$^2$ which has been substantially narrowed from 80 ps to approximately 40 ps, where the resolution limit is 20 ps. To understand the pulse narrowing, recall that at low powers of 80% of the incident light is coupled into the cladding. At high intensities the central intense portion of the pulse becomes detuned from the resonance and thus is no longer coupled to the cladding; rather it remains guided by the core. The wings of the pulse on the other hand are weak and do not shift the resonance and are thus coupled to the cladding, rather it remains guided by the core. The wings of the pulse on the other hand are weak and do not shift the resonance and are thus coupled to the cladding.

Figure 10:
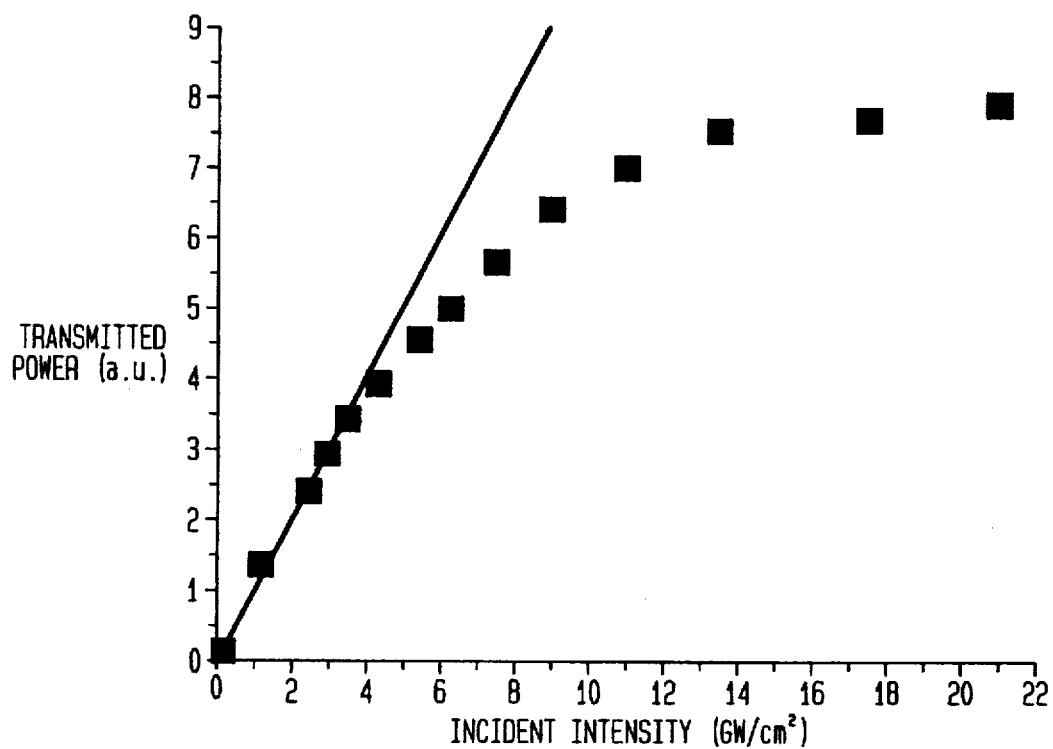
Figure 11:
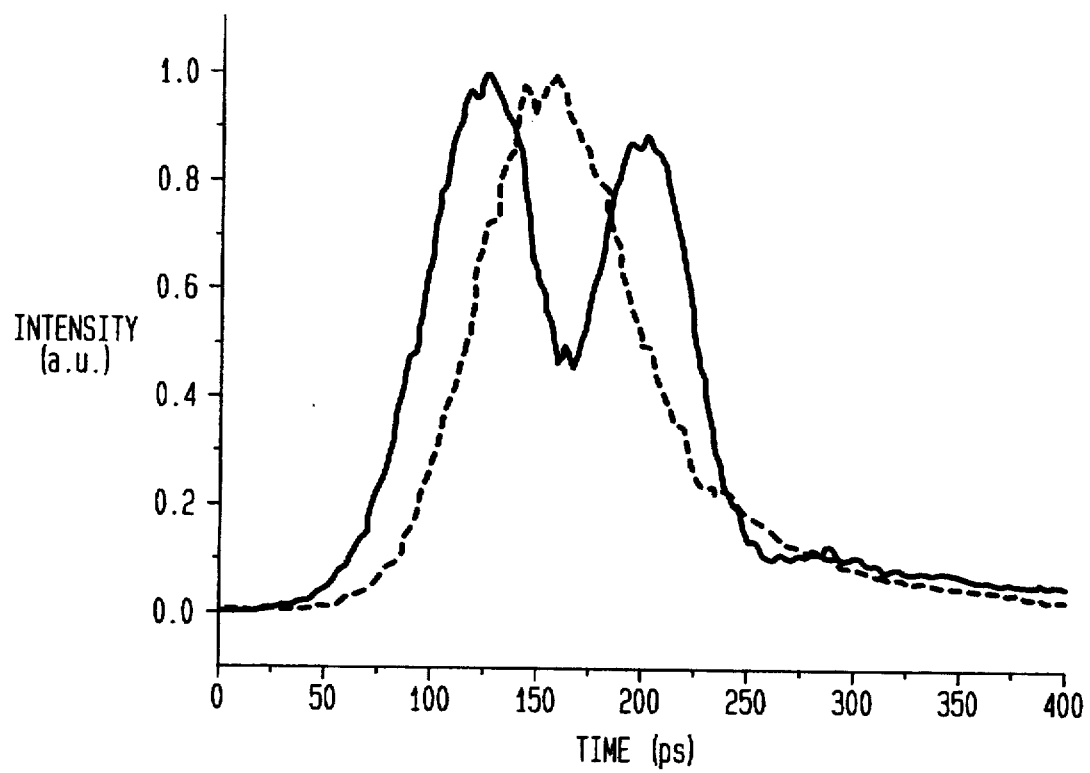

We then heated the grating to a temperature of 4020 C. such that the YLF spectrum was centered on the long wavelength side of the transmission resonance where the transmission is 80%. The measured transmission power versus incident intensity for a temperature of 40° C. is shown in FIG. 10. Note that the transmission is now sublinear, consistent with the transmission resonance being shifted to longer wavelengths at high intensities. The transmitted pulse for two different conditions is shown in FIG. 11. The solid line shows the transmitted intensity for an input intensity of 1 GW/cm$^2$ while the dashed line shows the transmitted intensity of 20 GW/cm². The bite taken out of the transmitted pulse is consistent with the peak of the pulse being coupled into the cladding while the wings remain guided by the core.

Thus all-optical switching of a long-period fiber grating has been achieved using pulses from a YLF laser. Switching effects were observed at intensities of several GW/cm² while at intensities of greater than 15 GW/cm² we observed pulse reshaping and pulse breakup. These switching intensities are dramatically less than that for a Bragg grating. By design of the waveguide the prefactor can be enhanced effectively reducing the intensities required for optical switching in fiber gratings.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. An optical switch for switching a beam of light between two optical modes comprising:

an optical waveguide comprised of a material having an effective index of refraction which changes as a non-linear function of light intensity and dimensioned for propagating light in at least two modes;

a long-period grating in said waveguide, said grating capable of coupling light from one of said modes to the other of said modes when said index of refraction is changed;

a variable intensity light source for introducing light into said waveguide in at least one of said two modes, said light source having a range of intensities sufficient to change said effective index of refraction of said waveguide by an amount sufficient to induce coupling between said modes.

2. A switch according to claim 1 further comprising a mode separator for receiving light from said waveguide and directing light in said two modes to respectively different optical paths.

3. A switch according to claim 2 wherein said mode separator comprises a spatial filter.

4. A switch according to claim 2 wherein said mode separator comprises a loop of optical fiber.

5. A switch according to claim 2 wherein said light paths from said mode separator comprise optical waveguides.

6. A switch according to claim 1 wherein said waveguide comprises optical fiber.

7. A switch according to claim 1 wherein said waveguide comprises optical planar waveguide.

8. A switch according to claim 1 wherein said waveguide has an mth cladding mode at wavelength $\lambda_m$, said grating has a length L, and said light source has an intensity range sufficient to change the effective index of said waveguide by at least $0.4\, \lambda_m/L$.

9. A switch according to claim 1 wherein said variable intensity light source comprises a first source of signal modulated light and a second source of higher intensity light to control switching.

10. An optical system comprising a source of signal-modulated light, a first length of optical waveguide for carrying said signal-modulated light, second and third lengths of optical waveguide and, for controllably switching said signal-modulated light between said second and third lengths of waveguide, an optical switch according to claim 1.

11. An optical switch for switching a beam of light between two optical modes comprising:

an optical waveguide comprised of a material having an effective index of refraction which changes as a non-linear function of light intensity and dimensioned for co-propagating light in at least two modes;

a long-period grating in said waveguide, said grating capable of coupling light from one of said modes to the other of said modes when said index of refraction is changed;

a composite light source for directing a plurality of light beams having different intensities into said waveguide, whereby a variation in the intensity of at least one of said beams changes said effective index of refraction of said waveguide by an amount sufficient to induce coupling between said modes.

12. The switch of claim 11, in which the material comprising the long-period grating is selected from silica glass and glasses doped with telluride or selenide.

13. The optical switch of claim 12, in which the composite light source directs said plurality of beams into said waveguide without first passing through a polarizer.

14. The optical switch of claim 11, in which the composite light source comprises a pair of lasers at least one of which is variable.

15. An optical system comprising:

a composite light source for directing signal-modulated light comprising a plurality of light beams having different intensities into a waveguide, a first length of optical waveguide for receiving and carrying the signal-modulated light from the light source to define a first transmission path, second and third lengths of optical waveguide to define a pair of output transmission paths, and a two-mode switch between the first transmission path and the pair of output transmission paths for controllably switching said signal-modulated light between the pair of output transmission paths, the switch comprising a long-period grating defined in a length of optical waveguide comprised of a material having an index of refraction which changes as a non-linear function of light intensity and dimensioned for co-propagating light in at least two modes, said grating being capable of coupling light between two modes when the index of refraction is changed depending upon the intensity of at least one of the beams of the composite light source and the non-linearity of the material comprising the waveguide.

* * * * *